US011669167B2

(12) United States Patent
Tan et al.

(10) Patent No.: US 11,669,167 B2
(45) Date of Patent: Jun. 6, 2023

(54) SINGLE-BRACKET SUPPORT STRUCTURE FOR FORCE SENSING AND HAPTIC FEEDBACK

(71) Applicant: Synaptics Incorporated, San Jose, CA (US)

(72) Inventors: Yeh-Cheng Tan, Fremont, CA (US); Yi-Yun Chang, Taipei (TW)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 17/507,602

(22) Filed: Oct. 21, 2021

(65) Prior Publication Data

US 2022/0147147 A1 May 12, 2022

Related U.S. Application Data

(60) Provisional application No. 63/110,486, filed on Nov. 6, 2020.

(51) Int. Cl.
*G06F 3/01* (2006.01)
*G06F 3/041* (2006.01)
*G06F 3/044* (2006.01)

(52) U.S. Cl.
CPC ............ *G06F 3/016* (2013.01); *G06F 3/0412* (2013.01); *G06F 3/0414* (2013.01); *G06F 3/0443* (2019.05); *G06F 3/0447* (2019.05); *G06F 2203/04105* (2013.01); *G06F 2203/04111* (2013.01)

(58) Field of Classification Search
CPC ...... G06F 3/016; G06F 3/0412; G06F 3/0414; G06F 3/0443; G06F 3/0447; G06F 2203/04105; G06F 2203/04111; G06F 3/044
See application file for complete search history.

(56) References Cited

U.S. PATENT DOCUMENTS

| | | | | |
|---|---|---|---|---|
| 4,558,757 A | * | 12/1985 | Mori | ................... G06F 3/04142 178/18.05 |
| 6,937,124 B1 | * | 8/2005 | Nakamura | ............. H01H 13/85 345/173 |
| 7,176,897 B2 | * | 2/2007 | Roberts | ............... G06F 3/04142 345/173 |
| 7,825,903 B2 | * | 11/2010 | Anastas | .................. G06F 3/016 345/173 |

(Continued)

*Primary Examiner* — Benyam Ketema
(74) *Attorney, Agent, or Firm* — Paradice & Li LLP (57) ABSTRACT

The present implementations relate to a support structure for an input device that supports deflection of an input surface responsive to input forces exerted thereon and vibration of the input surface responsive to haptic feedback generated by a haptic actuator. The support structure includes one or more fixed structures mounted to a housing and a dynamic surface mounted to a sensor layer of the input device. A number of first deformable segments cantilever from the one or more fixed surfaces and deflect in a vertical direction when an input force is exerted on the sensor layer, where the input force is orthogonal to the input surface. A number of second deformable segments connect the plurality of first deformable segments to the dynamic surface and deflect in a horizontal direction when shear forces are exerted on the dynamic surface, where the shear forces are parallel to the input surface.

18 Claims, 8 Drawing Sheets

(56) References Cited

U.S. PATENT DOCUMENTS

| | | | |
|---|---|---|---|
| 7,920,225 B2* | 4/2011 | Nishikawa | G06F 1/1626 349/12 |
| 7,948,337 B2* | 5/2011 | Chu | G11B 9/1481 335/78 |
| 8,059,104 B2* | 11/2011 | Shahoian | G06F 3/0338 345/173 |
| 8,144,453 B2* | 3/2012 | Brown | G02F 1/133526 345/173 |
| 8,169,332 B2* | 5/2012 | Son | G06F 3/0418 340/665 |
| 8,232,969 B2* | 7/2012 | Grant | G06F 3/03547 345/173 |
| 8,488,308 B2* | 7/2013 | Ng | G06F 3/0414 345/173 |
| 8,633,911 B2* | 1/2014 | Schediwy | G06F 3/044 345/173 |
| 8,633,916 B2* | 1/2014 | Bernstein | G06F 1/1662 345/174 |
| 9,086,740 B2* | 7/2015 | Furukawa | G06F 3/0338 |
| 9,389,688 B2* | 7/2016 | Tossavainen | H04R 7/04 |
| 9,910,494 B2* | 3/2018 | Westerman | G06F 3/04812 |
| 10,108,265 B2* | 10/2018 | Harley | G06F 3/016 |
| 10,254,837 B2* | 4/2019 | Tissot | G06F 3/0418 |
| 10,297,119 B1* | 5/2019 | Wiederhold | G08B 25/10 |
| 11,353,921 B2* | 6/2022 | Leung | G06F 1/169 |
| 2003/0214485 A1* | 11/2003 | Roberts | G06F 3/0418 345/173 |
| 2003/0214486 A1* | 11/2003 | Roberts | G06F 3/04142 345/173 |
| 2009/0243817 A1* | 10/2009 | Son | G06F 3/0418 345/173 |
| 2010/0149111 A1* | 6/2010 | Olien | G06F 3/041 345/173 |
| 2010/0182263 A1* | 7/2010 | Aunio | G06F 3/0414 345/173 |
| 2010/0302172 A1* | 12/2010 | Wilairat | G06F 3/04883 345/173 |
| 2010/0328229 A1* | 12/2010 | Weber | G06F 1/1643 340/407.1 |
| 2011/0227872 A1* | 9/2011 | Huska | G06F 3/016 345/174 |
| 2013/0009893 A1* | 1/2013 | Okumura | G06F 3/016 345/173 |
| 2013/0222267 A1* | 8/2013 | Almalki | G06F 3/04164 345/173 |
| 2013/0250502 A1* | 9/2013 | Tossavainen | G06F 3/016 361/679.01 |
| 2014/0145836 A1* | 5/2014 | Tossavainen | H04R 7/04 340/407.2 |
| 2014/0191973 A1* | 7/2014 | Zellers | G06F 3/0202 340/407.2 |
| 2015/0346881 A1* | 12/2015 | Watazu | G06F 3/047 345/174 |
| 2019/0025920 A1* | 1/2019 | Takeda | G06F 3/016 |
| 2019/0025925 A1* | 1/2019 | Zellers | G06F 3/016 |

\* cited by examiner

SINGLE-BRACKET SUPPORT STRUCTURE FOR FORCE SENSING AND HAPTIC FEEDBACK

CROSS-REFERENCE TO RELATED APPLICATION

This application claims priority and benefit under 35 USC § 119(e) to U.S. Provisional Patent Application No. 63/110,486, filed on Nov. 6, 2020, which is incorporated herein by reference in its entirety.

TECHNICAL FIELD

The present implementations relate generally to input devices, and specifically to a single-bracket support structure for input devices that support force sensing and haptics feedback.

BACKGROUND OF RELATED ART

Input devices, including proximity sensor devices (also commonly referred to as touchpads or touch sensor devices), are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touch pads integrated in, or peripheral to, notebook or desktop computers). Proximity sensor devices are also often used in smaller computing systems (such as touch screens integrated in cellular phones).

Some input devices may be capable of detecting an amount of force or pressure applied to an input surface, for example, based on a degree to which the input surface deforms or deflects under the application of such external forces. Force sensing may provide an additional dimension to the types of inputs that can be used to control or operate the electronic system. Among other examples, a user may provide "click" inputs by pressing down on the input surface as one would press on a button, key, or other mechanical actuator. However, unlike mechanical actuators, the deflection of the input surface provides little (if any) feedback to the user of the input device. As a result, some input devices have incorporated haptic actuators that can send vibrations to the input surface to provide haptic feedback to the user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a support structure for an input device. The support structure includes one or more fixed surfaces configured to be mounted to a housing, a dynamic surface configured to be mounted to a sensor layer of the input device, a plurality of first deformable segments cantilevering from the one or more fixed surfaces, and a plurality of second deformable segments connecting the plurality of first deformable segments to the dynamic surface. The plurality of first deformable segments is configured to deflect in a first direction responsive to an input force exerted on the sensor layer, where the input force is orthogonal to an input surface of the input device. The plurality of second deformable segments is configured to deflect in one or more second directions responsive to shear forces exerted on the dynamic surface, where the shear forces are parallel to the input surface.

Another innovative aspect of the subject matter of this disclosure can be implemented in an input device that includes a housing, a sensor layer, and a support structure. The support structure includes one or more fixed surfaces mounted to the housing, a dynamic surface mounted to the sensor layer, a plurality of first deformable segments cantilevering from the one or more fixed surfaces, and a plurality of second deformable segments connecting the plurality of first deformable segments to the dynamic surface. The plurality of first deformable segments is configured to deflect in a first direction responsive to an input force exerted on the sensor layer, where the input force is orthogonal to an input surface of the input device. The plurality of second deformable segments is configured to deflect in one or more second directions responsive to shear forces exerted on the dynamic surface, where the shear forces are parallel to the input surface.

BRIEF DESCRIPTION OF THE DRAWINGS

The present implementations are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general-purpose processor, conventional processor, controller, microcontroller, special-purpose processor, and/or state machine capable of executing scripts or instructions of one or more software programs stored in memory.

Various implementations relate generally to input devices capable of force sensing and haptic feedback. Some implementations more specifically relate to a support structure or bracket for an input device that supports deflection of an input surface responsive to input forces exerted thereon and vibration of the input surface responsive to haptic feedback generated by a haptic actuator. The support structure includes one or more fixed structures to be mounted to a housing and a dynamic surface to be mounted to a sensor layer of the input device. A number of first deformable segments cantilever from the one or more fixed surfaces and are configured to deflect in a vertical direction when an input force is exerted on the sensor layer, where the input force is orthogonal to the input surface. A number of second deformable segments connect the plurality of first deformable segments to the dynamic surface and are configured to deflect in a horizontal direction when shear forces are exerted on the dynamic surface, where the shear forces are parallel to the input surface. In some implementations, the support structure can be formed from a single continuous layer or sheet of spring metal.

Particular implementations of the subject matter described in this disclosure can be implemented to realize one or more of the following potential advantages. In some implementations, the described techniques can be used to manufacture a low-cost support bracket for an input device offering robust performance and user experience. For example, by forming the support bracket from a single sheet of metal, the manufacturing and assembly processes can be streamlined, and associated costs reduced. By deflecting in a vertical direction, the plurality of first deformable segments allow the input device to detect input forces exerted on the input surface, for example, by an input object. By deflecting in a horizontal direction, the plurality of second deformable segments allow the input device to provide haptic feedback via the input surface, for example, by a haptic actuator. Moreover, the integration of the first deformable segments with the second deformable segments allows the input device to provide the haptic feedback concurrently while receiving the input forces via the input surface.

Figure 1:
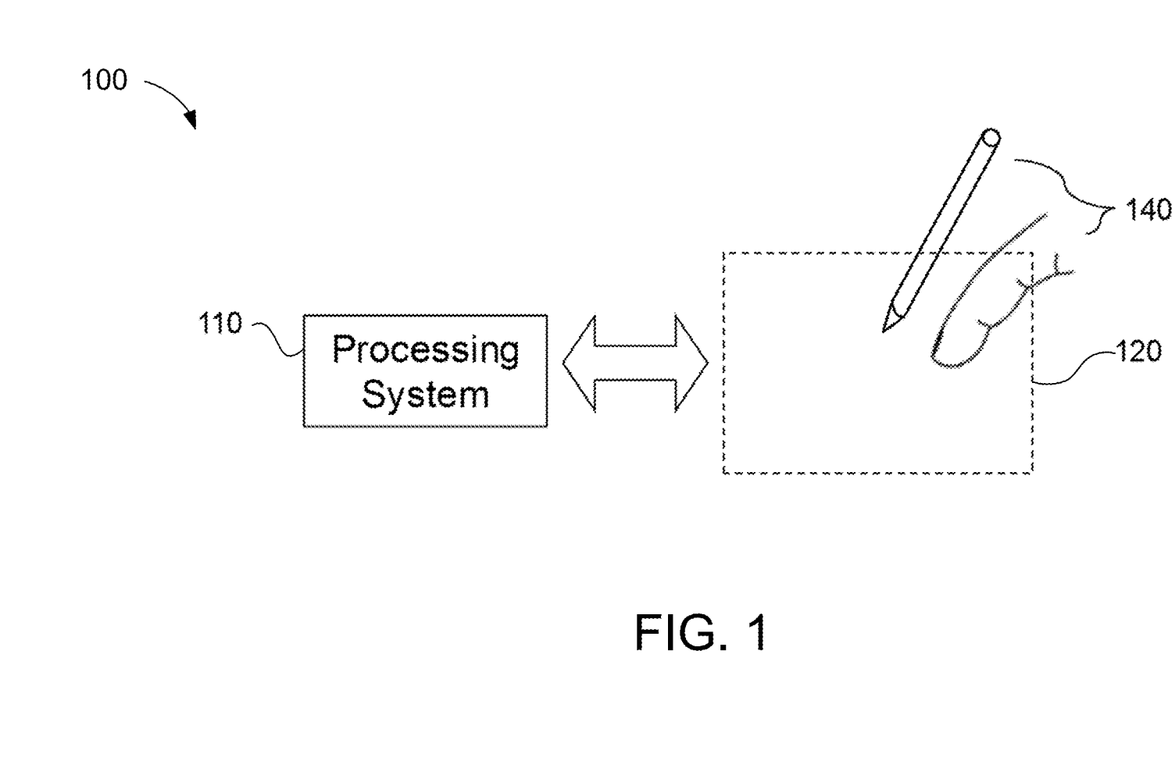
FIG. 1 shows an example input device which may be used with the present implementations.

FIG. 1 shows an example input device 100 which may be used with the present implementations. The input device 100 includes a processing system 110 and a sensing region 120. In some implementations, the input device 100 may be configured to provide input and/or control access to an electronic system (not shown for simplicity). Example electronic systems may include, but are not limited to, personal computing devices (e.g., desktop computers, laptop computers, netbook computers, tablets, web browsers, e-book readers, personal digital assistants (PDAs), and the like), composite input devices (e.g., physical keyboards, joysticks, key switches, and the like), data input device (e.g., remote controls, mice, and the like), data output devices (e.g., display screens printers, and the like), remote terminals, kiosks, video game machines (e.g., video game consoles, portable gaming devices, and the like), communication devices (e.g., cellular phones, smartphones, and the like), and media devices (e.g., recorders, editors, televisions, set-top boxes, music players, digital photo frames, digital cameras, and the like).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example suitable technologies may include Inter-Integrated Circuit ($I^2C$), Serial Peripheral Interface (SPI), PS/2, Universal Serial bus (USB), Bluetooth®, Infrared Data Association (IrDA), and various radio frequency (RF) communication protocols defined by the IEEE 802.11 family of standards.

In the example of FIG. 1, the input device 100 may correspond to a proximity sensor (also referred to as a "touchpad" or "touch sensor device") configured to sense input provided by an input object 140 in the sensing region 120. Example input objects 140 include fingers, styli, active pens, among other examples. The sensing region 120 may encompass any space above, around, in, and/or proximate to the input device 100 in which the input device 100 is able to detect user input. The size, shape, and/or location of the sensing region 120 may vary depending on actual implementations. In some implementations, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired.

The input device 100 may utilize various sensing technologies to detect user input. Example sensing technologies may include capacitive, optical, elastive, resistive, inductive, magnetic, acoustic, and ultrasonic sensing technologies. In some implementations, the sensing region 120 may be formed by an array of capacitive sensing elements (e.g., sensor electrodes) that are used to measure changes in capacitance resulting from a finger interacting with the sensing region 120. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" electrodes and one or more "receiver" electrodes. Transmitter electrodes may be modulated relative to the receiver electrodes. For example, the transmitter electrodes may be modulated relative to a reference voltage to transmit signals, while the receiver electrodes may be held at a relatively constant voltage to "receive" the transmitted signals. The signals received by the receiver electrodes may be affected by environmental interference (e.g., from objects in contact with, or in close proximity to, the sensor electrodes). In some aspects, each sensor electrode may either be a dedicated transmitter or a dedicated receiver. In other aspects, each sensor electrode may be configured to transmit and to receive.

In some implementations, the input device 100 may further detect a force exerted on an input surface coinciding with the sensing region 120. For example, the input device 100 may include one or more force sensors configured to generate force information representative of the force exerted by the input object 140 when making contact with the sensing region 120. The force information may be in the form of electrical signals representative of the amount of force applied to the input surface. For example, the force sensors may be formed, at least in part, by multiple layers of conductors provided on an underside of the input surface. The input surface may be configured to deflect or compress under an application of force by the input object 140. The movement of the input surface may cause a change in displacement between the conductors of the force sensor. The force sensors may produce electrical signals based on a change in capacitance between the conductors resulting from the deflection of the input surface. Thus, the change in capacitance may correlate with the amount of force exerted on the input surface.

The processing system 110 may be configured to operate the hardware of the input device 100 to detect input in the sensing region 120. In some implementations, the processing system 110 may control one or more sensor electrodes and/or force sensors to detect objects in the sensing region 120. For example, the processing system 110 may be configured to transmit signals via one or more transmitter sensor electrodes and receive signals via one or more receiver sensor electrodes. The processing system 110 may also be configured to receive force sensing signals via one or more force sensors. In some aspects, one or more components of the processing system 110 may be co-located, for example, in close proximity to the sensing elements of the input device 100. In some other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

The processing system 110 may be implemented as a set of modules that are implemented in firmware, software, or a combination thereof. Example modules include hardware operation modules for operating hardware such as one or more sensing elements; data processing modules for processing data such as sensor signals; and reporting modules for reporting information to other components of the electronic system such as a host processor or CPU. In some implementations, the processing system 110 may include sensor operation modules configured to operate sensing elements to detect user inputs in the sensing region 120; identification modules configured to identify gestures associated with certain user inputs; and mode changing modules for changing operation modes of the input device 100 and/or electronic system.

In some aspects, the processing system 110 may respond to user input in the sensing region 120 by triggering one or more actions. Example actions include changing an operation mode of the input device 100 and/or graphical user interface (GUI) action such as cursor movement, selection, menu navigation, and the like. In some implementations, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 100 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some implementations, the processing system 110 may further determine positional information and/or force information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. Likewise, the term "force information," as used herein, refers to any information describing or otherwise indicating a force exerted by an input object in contact with an input surface of the input device 100. For example, the force information may be provided as a vector or scalar quantity (e.g., indicating a direction and/or amplitude). As another example, the force information may include a time history component and/or describe whether the force exerted by the input object exceeds a threshold amount.

In some implementations, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some implementations, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some implementations, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, force sensing may provide an additional dimension to the types of inputs that can be used to control or operate the electronic system. Among other examples, a user may provide "click" inputs by pressing down on the input surface as one would press on a button, key, or other mechanical actuator. However, unlike mechanical actuators, the deflection of the input surface provides little (if any) feedback to the user of the input device. In some implementations, the input device 100 may further include one or more haptic actuators (such as linear resonance actuators (LRAs), piezoelectric actuators, and the like) to provide haptic feedback to a user of the input device 100. For example, the processing system 110 may operate the haptic actuators to send vibrations to the input surface responsive to detecting a force input via the one or more force sensors.

Aspects of the present disclosure recognize that the haptic feedback causes movement of the input surface in a direction orthogonal to the direction of the input force. For example, assuming the input object 140 applies an input force in a vertical direction (e.g., orthogonal to the plane of the input surface), the haptic actuator may apply vibration forces in a horizontal direction (e.g., parallel to the plane of the input surface). Thus, one of the challenges of combining haptic feedback with force sensing is designing an input device or apparatus having an input surface that can deflect in multiple orthogonal directions. In particular, the present implementations provide a support structure for the input device that allows a horizontal movement of the input surface (e.g., responsive to haptic feedback) while the input surface is vertically compressed (e.g., responsive to input forces).

Figure 2:
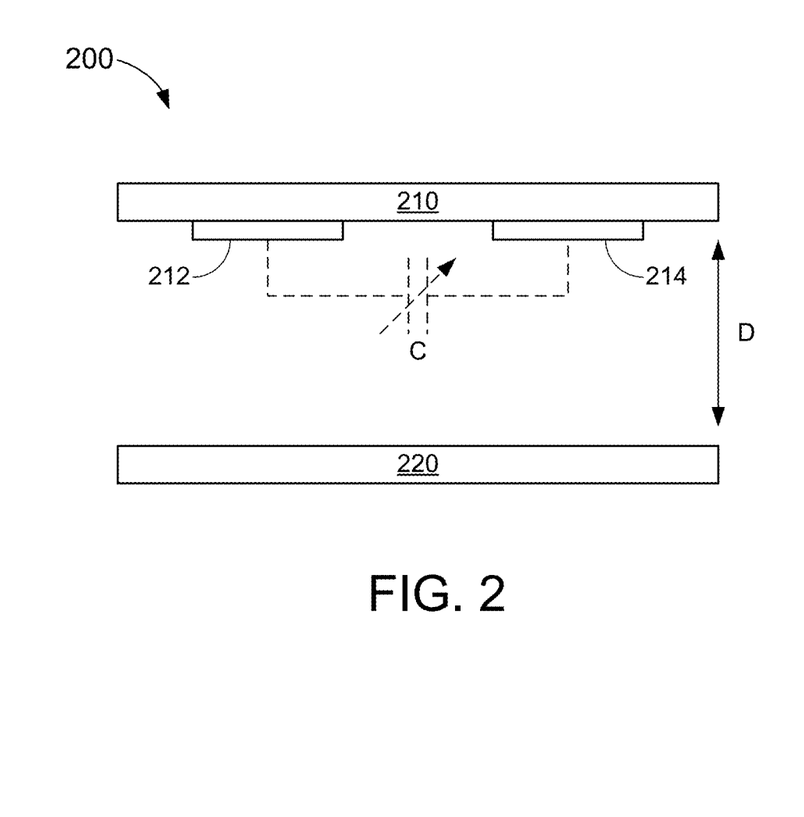
FIG. 2 shows an example force sensor configuration for an input device, in accordance with some implementations.

FIG. 2 shows an example force sensor configuration for an input device 200, in accordance with some implementations. In some implementations, the input device 200 may be one example of the input device 100 of FIG. 1. The input device 200 includes an upper layer 210 and a lower layer 220. For simplicity, only two layers of the input device 200 are depicted in FIG. 2 for purposes of illustrating the force sensor configuration. However, in actual implementations, the input device 200 may include additional layers and/or sensor circuitry not shown in FIG. 2.

In the example of FIG. 2, a pair of force sensing electrodes 212 and 214 are coupled to the upper layer 210 of the input device 200. In some implementations, force sensing electrode 212 may be a transmitter electrode and force sensing electrode 214 may be a receiver electrode. A processing system (such as processing system 110) may drive a force sensing signal on the transmitter electrode 212 and receive a resulting signal via the receiver electrode 214 to measure or detect a capacitance (C) between the pair of force sensing electrodes 212 and 214. In some implementations, the lower layer 220 may be formed from (or include) a conductive material that can be grounded or driven to a particular voltage level.

In some implementations, the upper layer 210 may be further coupled to an input surface (not shown for simplicity) of the input device 200. Thus, the upper layer 210 may deflect towards the lower layer 220 responsive to input forces exerted on the input surface. As the upper layer 210 is brought closer to the lower layer 220, the voltage on the lower layer 220 effects a change in the capacitance C between the pair of force sensing electrodes 212 and 214. Thus, the voltage on the lower layer 220 may alter the capacitance C between the force sensing electrodes 212 and 214 based, at least in part, on the distance (D) between the upper layer 210 and the lower layer 220. More specifically, the change in capacitance C between the force sensing electrodes 212 and 214 increases as the distance D between the layers 210 and 220 decreases.

Figure 3A:
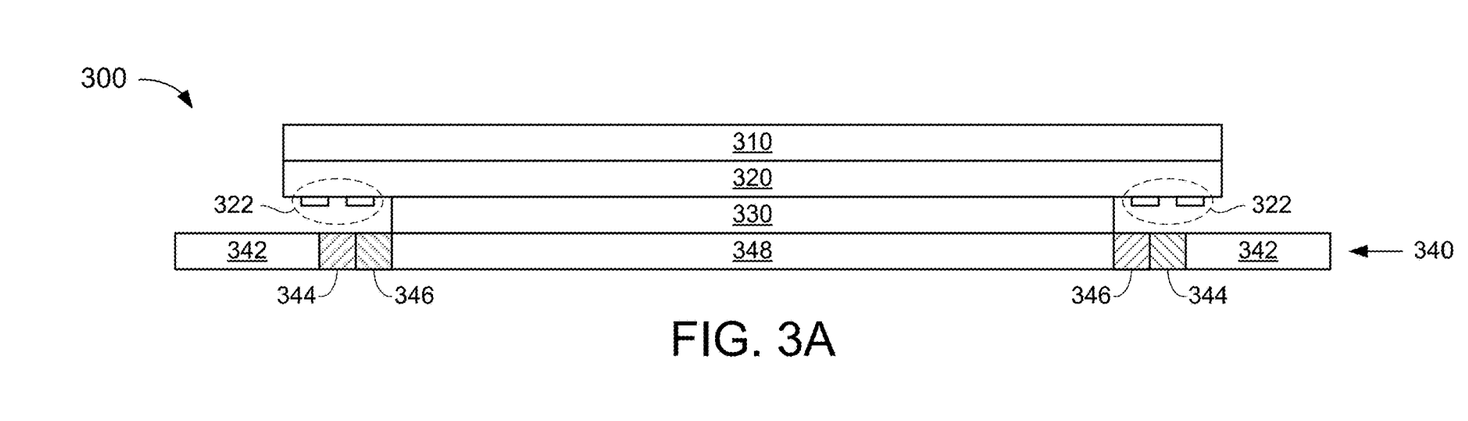
FIGS. 3A and 3B show an example stack-up of an input device, in accordance with some implementations.
Figure 3B:
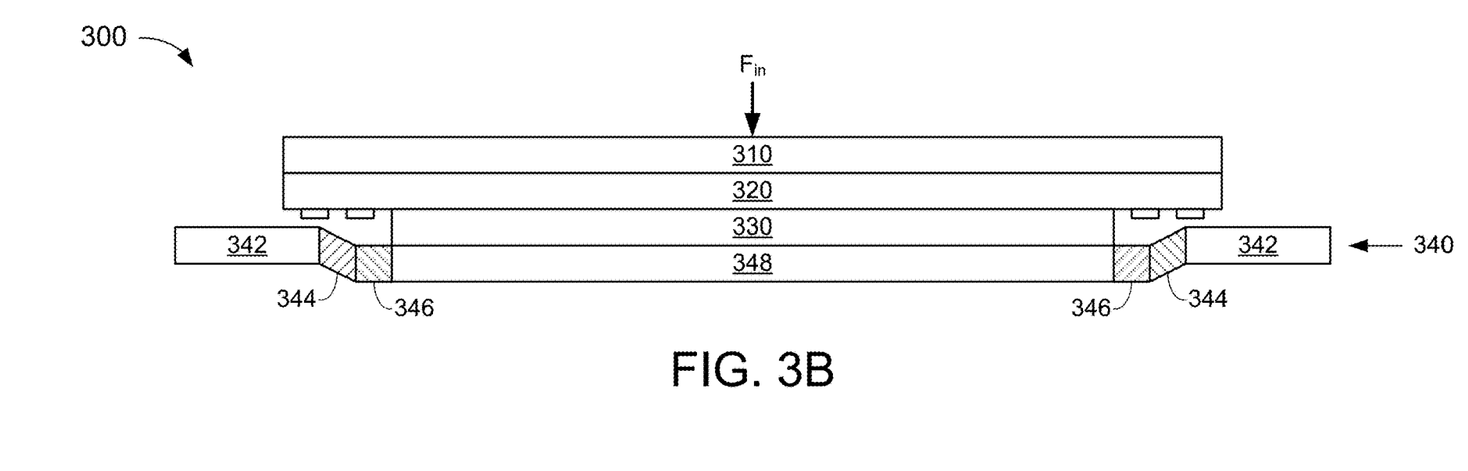

FIGS. 3A and 3B show an example stack-up of an input device 300, in accordance with some implementations. More specifically, FIG. 3A depicts the input device 300 in an uncompressed state (e.g., absent any input forces) and FIG. 3B depicts the input device 300 in a compressed state (e.g., under application of one or more input forces). In some implementations, the input device 300 may be one example of any of the input devices 100 or 200 of FIG. 1 or 2, respectively.

The input device includes a cover layer 310, a sensor layer 320, a spacer layer 330, and a support layer 340. The cover layer 310 protects the circuitry disposed below and serves as an input surface for the input device 300. For example, the cover layer 310 may be formed from plastic, glass, Mylar, or any other suitable material that can deform or deflect under the application of input forces and return to its original form when such input forces are absent. In some aspects, the cover layer may be transparent. In some other aspects, the cover layer may be painted or opaque.

The sensor layer 320 includes sensor circuitry for the input device 300. As shown in FIG. 3A, the sensor layer 320 includes a number of force sensing electrodes 322 disposed thereon. For example, the sensor layer 320 may include a printed circuit board (PCB) formed from a glass-reinforced epoxy laminate sheet (e.g., FR4) or a polyethylene terephthalate (PET) film. In some implementations, the sensor layer 320 may be one example of the upper layer 210 of the input device 200. With reference for example to FIG. 2, the force sensing electrodes 322 may be one example of the force sensing electrodes 212 and 214 of FIG. 2. Accordingly, the force sensing electrodes 322 may include one or more transmitter electrodes paired with one or more receiver electrodes. In some other implementations, the sensor layer 320 may include additional sensor circuitry not shown in FIG. 3A or 3B such as, for example, a number of sensor electrodes configured for capacitive (e.g., proximity) sensing.

The spacer layer 330 couples the sensor layer 320 to the support layer 340 below. For example, the space layer 330 may be formed from an adhesive material (e.g., glue). In some implementations, the spacer layer 330 may maintain a distance of separation between the sensor layer 320 and the support layer 340. With reference for example to FIG. 2, the separation distance between the sensor layer 320 and the support layer 340 may be one example of the distance D between the upper layer 210 and the lower layer 220 of the input device 200. Thus, the distance of separation between the sensor layer 320 and the support layer 340 may vary depending on whether the spacer layer 330 is in the uncompressed state (e.g., when no input forces are exerted on the input surface such as shown in FIG. 3A) or the compressed state (e.g., when an input force is exerted on the input surface such as shown in FIG. 3B).

The support layer 340 further couples the input device 300 to a housing (or midframe) of the input device 300 or an underlying electronic system. For example, the support layer 340 may include a number of fixed surfaces 342 that can be mounted or affixed to the housing. The fixed surfaces 342 do not move or deflect relative to the housing. In some implementations, the support layer 340 may include a first set of deformable segments 344 and a second set of deformable segments 346. The deformable segments 344 are attached to, and cantilever from, the fixed surfaces 342. In some aspects, the deformable segments 344 are configured to deflect in a vertical direction (e.g., orthogonal to the input surface). The deformable segments 346 connect the deformable segments 344 to a dynamic surface 348. In some aspects, the deformable segments 346 are configured to deflect in a horizontal direction (e.g., parallel to the input surface). The dynamic surface 348 is configured to move laterally (in horizontal or vertical directions) relative to the fixed surfaces 342 in response to deflection of the deformable segments 344 or 346.

The dynamic surface 348 is coupled to the sensor layer 320 (e.g., via the spacer layer 330). In some implementations, the support layer 340 may be one example of the lower layer 220 of the input device 200. Thus, the support layer 340 may be formed from a conductive material that can be grounded or driven to a particular voltage level. In some aspects, the support layer 340 may be formed from a single continuous layer of material. More specifically, the support layer 340 may be formed from any suitable material having spring-like properties such that the deformable segments 344 and 346 can deform or deflect under application of force and return to their original shapes or configurations in the absence of such forces. Example suitable materials include various types of spring metals (e.g., spring steel).

The deformable segments 344 may enable the dynamic surface 348 to move or deflect in a vertical direction responsive to input forces ($F_{in}$) exerted on (and orthogonal to) the input surface. As shown in FIG. 3B, movement of the dynamic surface 348 in the vertical direction may bring the force sensing electrodes 322 closer to one or more portions of the support layer 340, resulting in changes in capacitance between transmitter electrodes and receiver electrodes of the force sensing electrodes 322. The changes in capacitance can be measured (by the processing system) as an input force. Further, the deformable segments 346 enable the dynamic surface 348 to move or deflect in a horizontal direction responsive to shear forces exerted on the dynamic surface 348. As described in greater detail below, the shear forces may correspond to haptic feedback generated by a haptic actuator.

Figure 4:
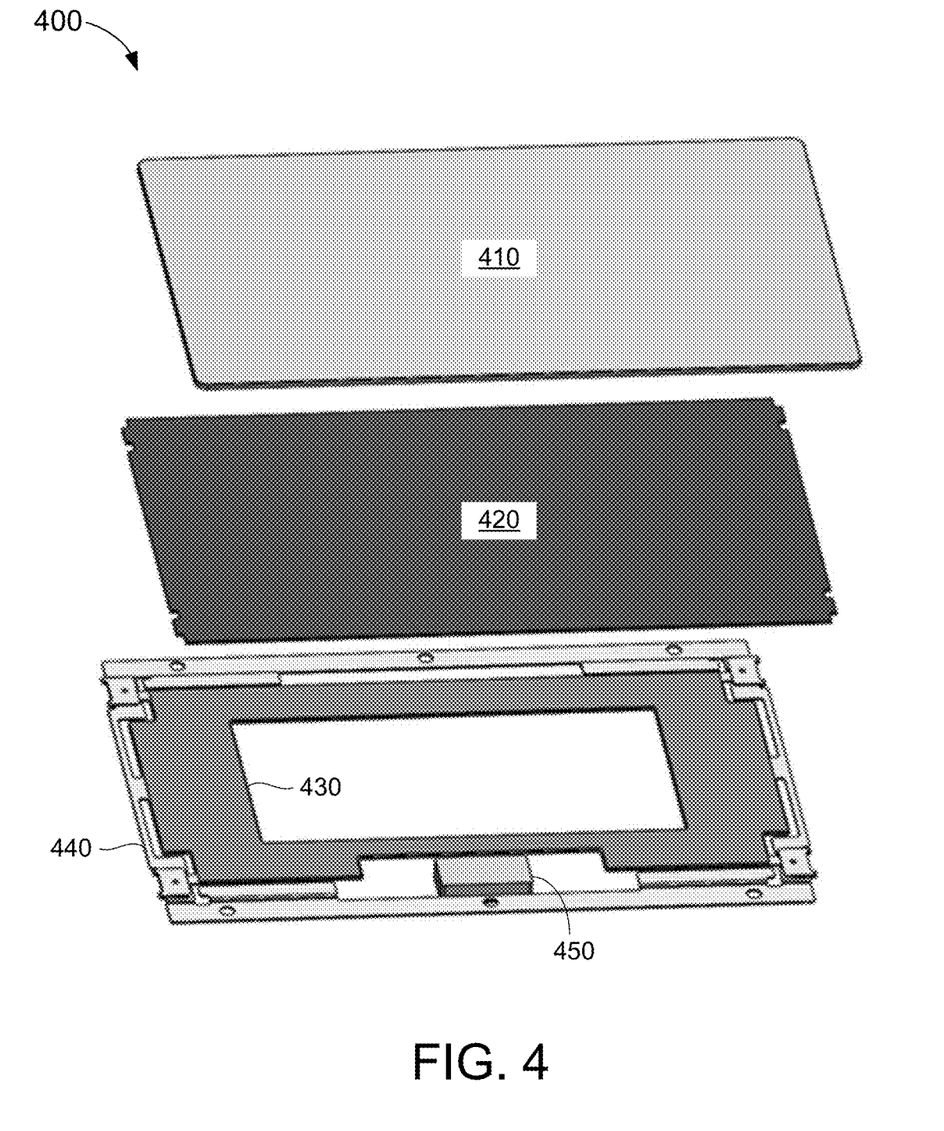
FIG. 4 shows an exploded isometric view of an input device, in accordance with some implementations.

FIG. 4 shows an exploded isometric view of an input device 400, in accordance with some implementations. The input device 400 includes a cover layer 410, a sensor layer 420, a spacer layer 430, a support layer 440, and a haptic actuator 450. In some implementations, the input device 400 may be one example of the input device 300 of FIG. 3. Thus, the cover layer 410, sensor layer 420, spacer layer 430, and support layer 440 may be example implementations of the cover layer 310, sensor layer 320, spacer layer 330, and support layer 340, respectively, of the input device 300.

As shown in FIG. 4, the spacer layer 430 is disposed over a portion of the support layer 440. In some implementations, the spacer layer 430 covers only a dynamic surface of the support layer 440 (such as the dynamic surface 348 of FIG. 3). Accordingly, the spacer layer 430 may couple the dynamic surface to a center region of the sensor layer 420 while allowing the outer regions (e.g., along the perimeter) of the sensor layer 420 to "float" above respective portions of the support layer 440. As a result, an air gap may be formed between force sensing electrodes disposed on the sensor layer 420 and conductive surfaces of the support layer 440. As described with reference to FIGS. 2 and 3, the air gap supports a change in distance between the force sensing electrodes of the sensor layer 420 and the conductive surfaces of the support layer 440 responsive to input forces exerted on an input surface of the input device 400 (e.g., the cover layer 410).

In some implementations, the haptic actuator 450 may be disposed beneath the sensor layer 420. The haptic actuator 450 may be coupled to the sensor layer 420 and/or the dynamic surface of the support layer 440. The haptic actuator 450 may be any suitable device capable of producing vibrations or haptics including, but not limited to, linear resonance actuators (LRAs) and piezoelectric actuators. In some aspects, the vibrations generated by the haptic actuator 450 may exert shear forces on the dynamic surface of the support layer 440. More specifically, such shear forces may cause lateral movements of the support layer 440 (e.g., parallel to the input surface). As described above with reference to FIG. 3, the support layer 440 may include one or more features that allow the dynamic surface to move vertically and horizontally relative to one or more fixed surfaces. In some implementations, such features may be integrally formed with the dynamic surface and the fixed surfaces such that the support layer 440 can be produced or manufactured from a single continuous layer of material (e.g., a single sheet of metal).

Figure 5A:
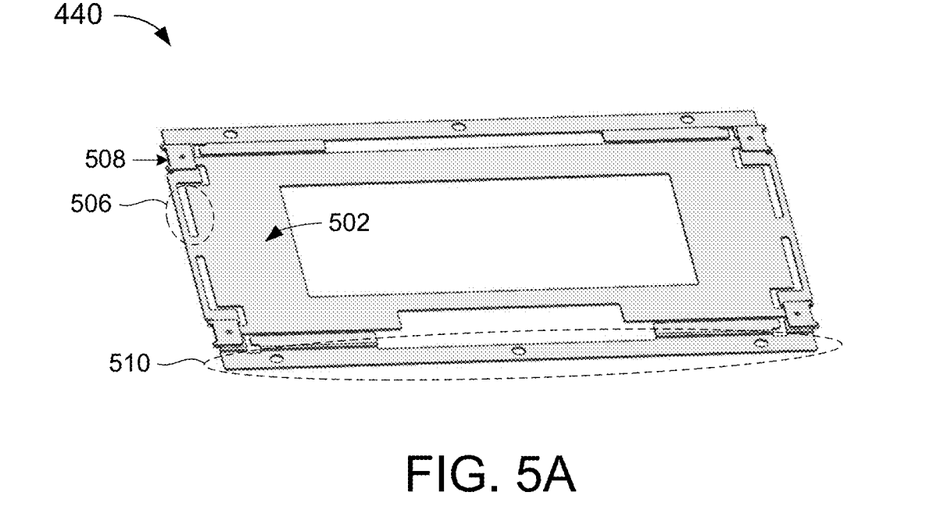
FIGS. 5A and 5B show perspective views of the support layer for the input device depicted in FIG. 4.
Figure 5B:
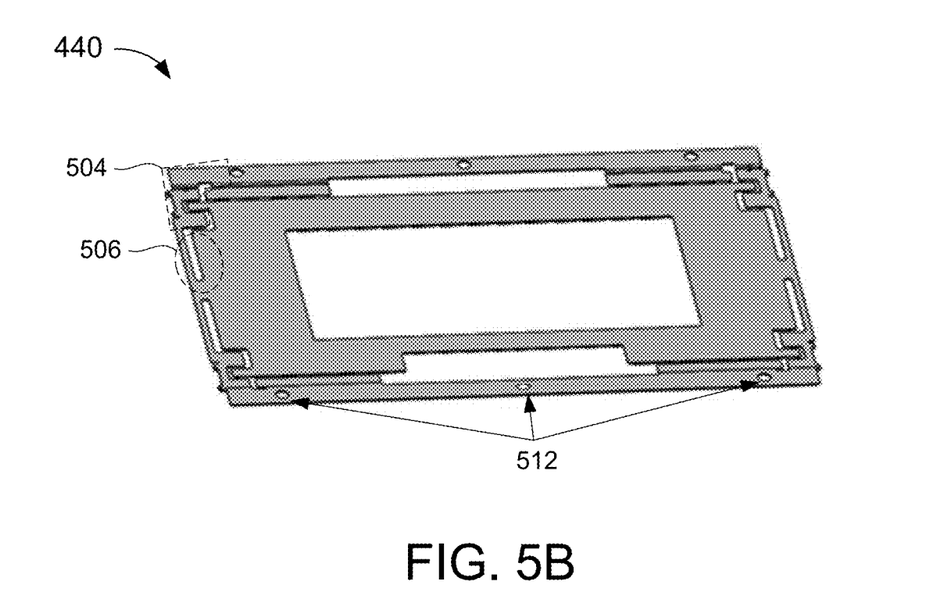

FIGS. 5A and 5B show perspective views of the support layer 440 for the input device 400 depicted in FIG. 4. More specifically, FIG. 5A shows a top perspective view of the support layer 440 and FIG. 5B shows a bottom perspective view of the support layer 440. The support layer 440 also may be referred to herein as a support structure or a support bracket.

As shown in FIGS. 5A and 5B, the support layer 440 includes a dynamic surface 502 and a number of fixed surfaces 510 that can be mounted to or affixed to a housing of the input device 400 or an underlying electronic system. In some implementations, the dynamic surface 502 and fixed surfaces 510 may be examples of the dynamic surface 348 and fixed surfaces 342, respectively, of FIG. 3. For example, each fixed surface 510 may include one or more mounting features 512 (depicted as through-holes in FIGS. 5A and 5B) that can be affixed to respective portions of the housing. Once mounted, the fixed surfaces 510 may not move relative to the housing of the input device 400.

The dynamic surface 502 is coupled to the fixed surfaces 510 via a number of deformable segments 504 and 506. In some implementations, the deformable segments 504 and 506 may be examples of the deformable segments 344 and 346, respectively, of FIG. 3. In the example of FIGS. 5A and 5B, a set of deformable segments 504 and 506 may be provided in each corner of the support layer 440. In some implementations, the deformable segments 504 and 506 may be coplanar with the dynamic surface 502. More specifically, deformable segments 504 are attached to, and cantilever from, the fixed surfaces 510 and deformable segments 506 connect the deformable segments 504 to the dynamic surface 502. With reference for example to FIGS. 3A and 3B, deformable segments 504 and 506 may correspond to deformable segments 344 and 346, respectively, of the input device 300. Thus, deformable segments 504 may be configured to deflect in a vertical direction whereas deformable segments 506 may be configured to deflect in a horizontal direction.

In some implementations, the support layer 440 may further include a number of bridge elements 508. Each of the bridge elements 508 may at least partially overlap a top surface of a respective deformable segment 504. The bridge elements 508 may provide structural support for the sensor layer 420. For example, the corners of the sensor layer 420 may rest on top of the bridge elements 508. In some aspects, the bridge elements 508 may help spread or distribute input forces applied to the input surface to achieve a more uniform distribution at the corners of the sensor layer 420. For example, the bridge elements 508 may transfer input forces to the deformable segments 504 and/or portions of the dynamic surface 502 below. In some other aspects, the bridge elements 508 may serve as a "bridge" over one or more portions of the dynamic surface 502. For example, the bridge elements 508 may enable the dynamic surface 502 to move laterally relative to the deformable segment 504 even under the application of input forces.

Figure 6:
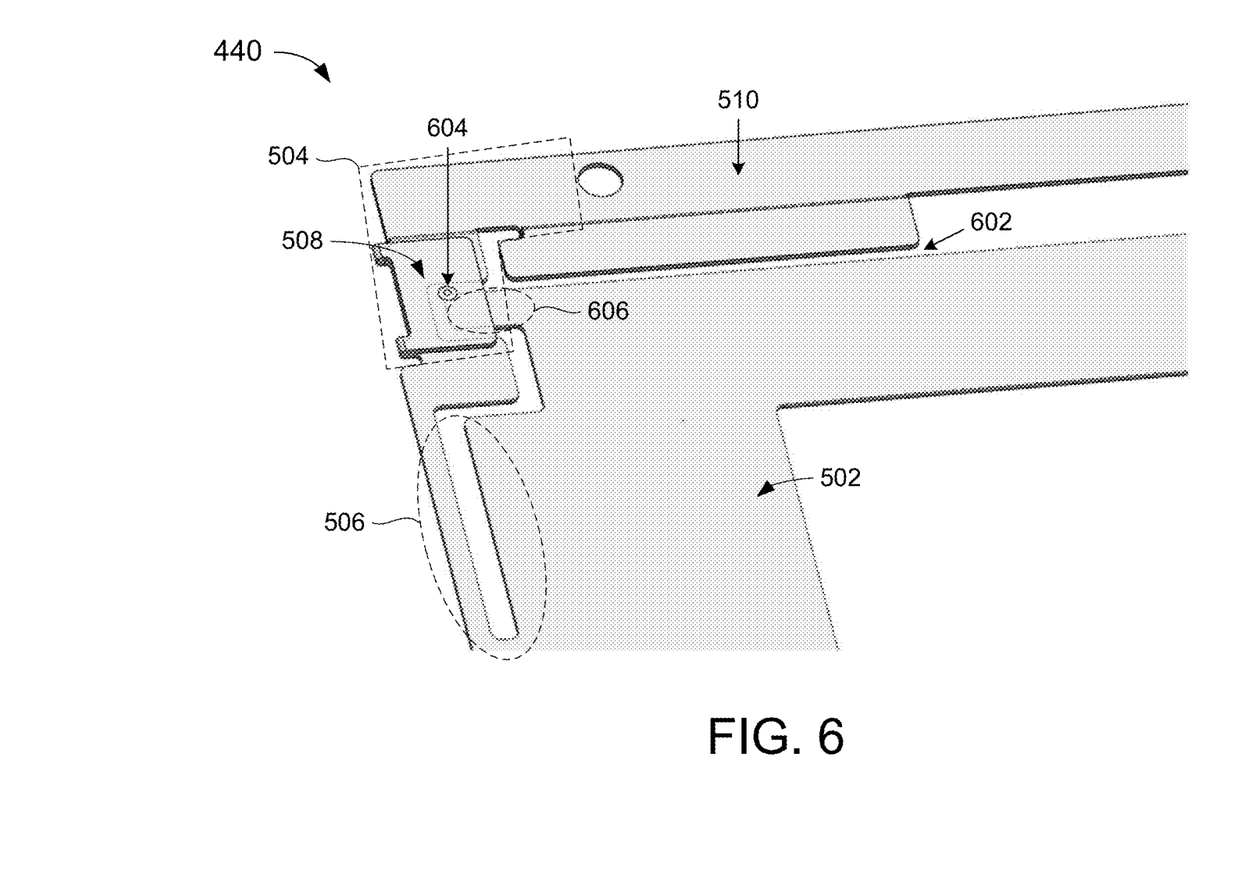
FIG. 6 shows a more detailed view of the support structure shown in FIGS. 5A and 5B.

FIG. 6 shows a more detailed view of the support structure 440 shown in FIGS. 5A and 5B. With reference for example to FIG. 5A, only the upper left corner of the support structure 440 is depicted in FIG. 6.

As shown in FIG. 6, an air gap 602 is formed along a partial perimeter of the dynamic surface 502 to minimize the areas of contact between the dynamic surface 502 and other portions of the support layer 440. More specifically, the dynamic surface 502 is connected only to the ends of deformable segments 506. In this manner, the deformable segments 504 and 506 effectively suspend the dynamic surface 502 from the fixed surfaces 510, allowing the dynamic surface 502 to move vertically and horizontally relative thereto. In some implementations, deformable segments 504 may deflect vertically responsive to input forces exerted on the input surface. For example, the deflection of deformable segments 504 may cause variations in the air gap between the dynamic surface 502 and the fixed surfaces 510. In some implementations, deformable segments 506 may deflect horizontally responsive to sheer forces exerted on the dynamic surface 502. For example, the deflection of deformable segments 506 may cause variations in the air gap between the dynamic surface 502 and the deformable segments 504 and 506.

In some implementations, the dynamic surface 502 may include a number of protrusions 606 that extend beneath the bridge elements 508. In some aspects, the protrusions 606 may assist with the transfer of input forces to the dynamic surface 502. For example, when a force is exerted on a corner of the sensor layer 420, the bridge element 508 may transfer the force from the sensor layer 420 to the deformable segment 504 and the protrusion 606 below. In some other aspects, the bridge elements 508 may anchor the corners of the dynamic surface 502 via the protrusions 606. For example, when a force is applied to a particular corner or side of the sensor layer 420, the protrusions 606 on the opposite side or corner of the input device 400 may hook to the undersides of respective bridge elements 508 to prevent such corners of the dynamic surface 502 from lifting (and thus causing an unwanted change in capacitance between pairs of force sensing electrodes). In some implementations, the bridge elements 508 may include raised bumps 604 configured to be seated in respective grooves in the sensor layer 420.

Figure 7A:
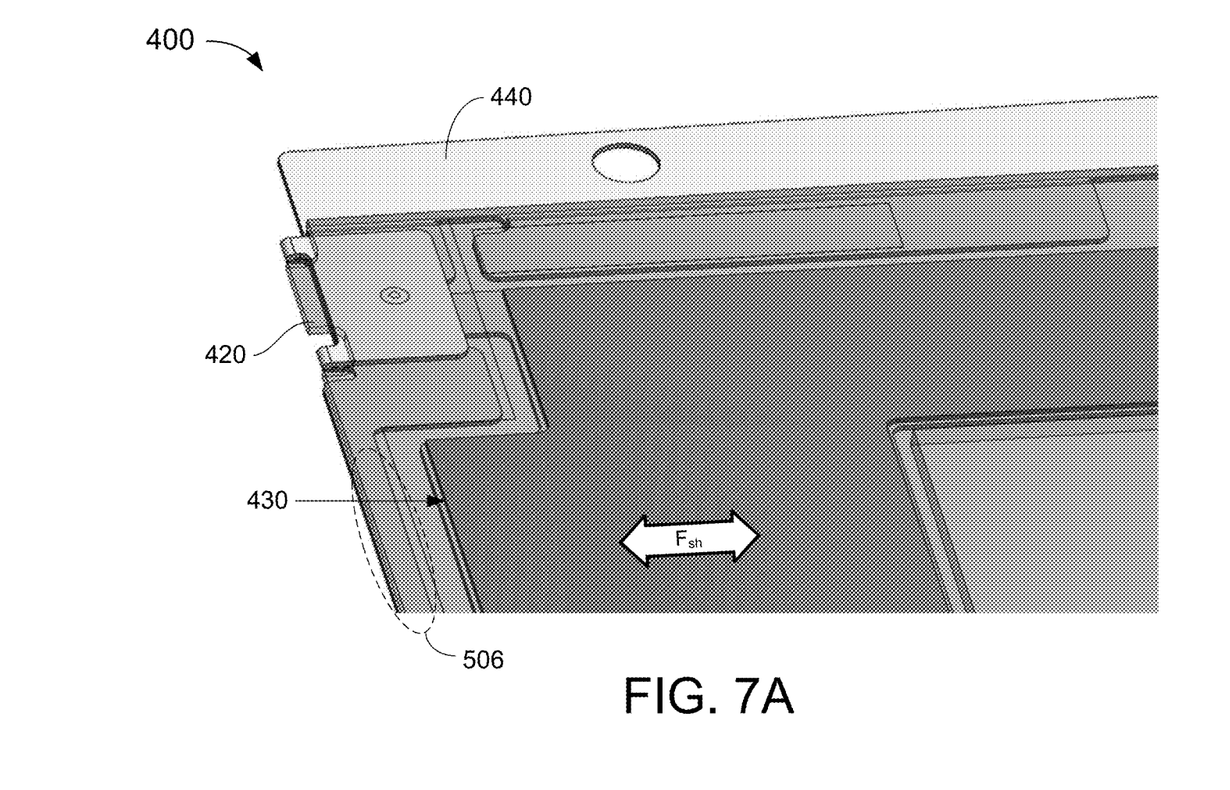
FIGS. 7A and 7B show an example stack-up of the input device depicted in FIG. 4.
Figure 7B:
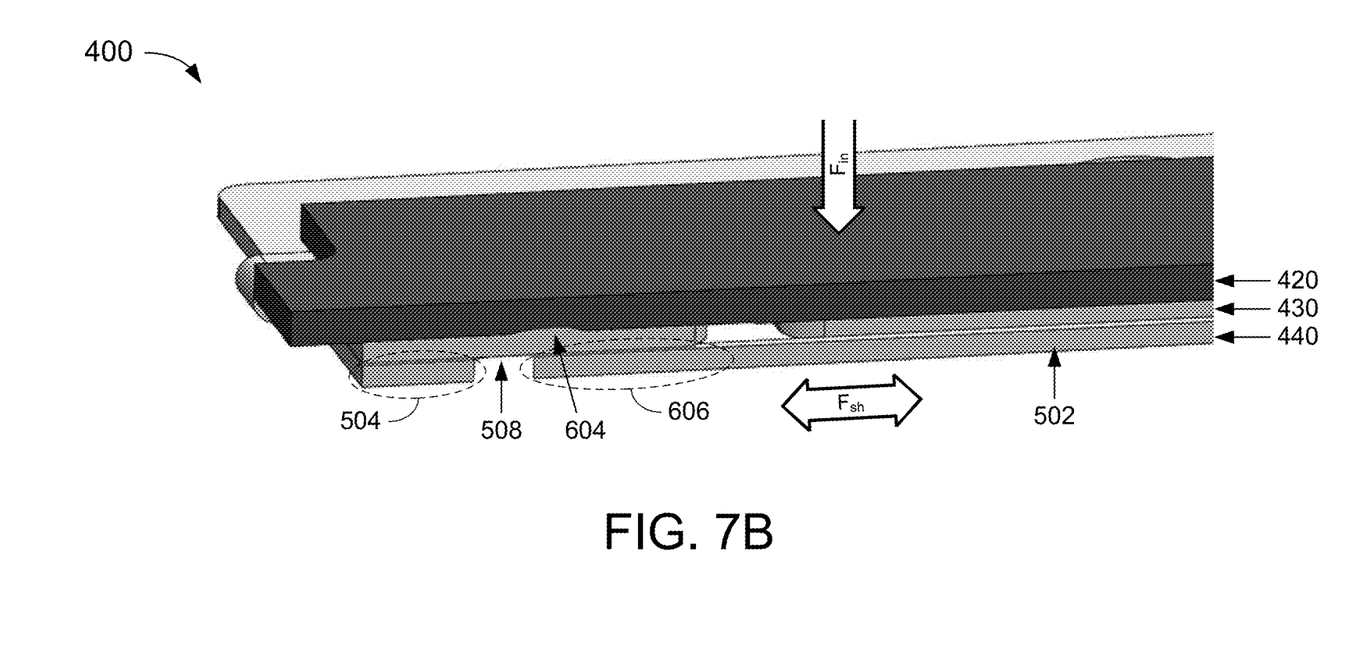

FIGS. 7A and 7B show an example stack-up of the input device 400 depicted in FIG. 4. More specifically, FIG. 7A shows a perspective view of the upper left corner of the input device 400 and FIG. 7B shows a cross-sectional view of the upper left corner of the input device 400.

As shown in FIGS. 7A and 7B, the spacer layer 430 is disposed on the dynamic surface 502 and couples or attaches the sensor layer 420 to the support layer 440. However, the sensor layer 420 is not attached to any portion of the support layer 440 beyond the dynamic surface 502. For example, the corner of the sensor layer 420 may rest upon the bridge element 508. With reference for example to FIG. 7B, the bump 604 may be seated within a respective groove on the bottom surface of the sensor layer 420 to maintain contact between the bridge element 508 and the sensor layer 420. For example, the bump 604 may remain in (spot) contact with the sensor layer 420 even as the support layer 440 deforms or rotates relative to the sensor layer 420 under application of force. In the examples of FIGS. 6-7B, the bump 604 is depicted as being formed or disposed on the bridge element 508. However, in some other implementations, a bump may be formed on the sensor layer 420 (and a respective groove formed on the bridge element 508), for example, using a solder paste point on the PCB. Further, the protrusion 606 is tucked under the bridge element 508 to further prevent the corners of the sensor layer 420 from lifting or separating from the support layer 440.

As shown in FIG. 7A, deformable segments 506 may deflect horizontally responsive to shear forces ($F_{sh}$) exerted on the dynamic surface 502 to facilitate the transfer of haptic feedback from the dynamic surface 502 to the input surface of the input device 400. As shown in FIG. 7B, deformable segments 504 may deflect vertically responsive to input forces ($F_{in}$) exerted on the dynamic surface 502 to facilitate the detection of input forces on the input surface of the input device 400. In some implementations, the deflection of deformable segments 504 does not impede deformable segments 506 from deflecting. In other words, the dynamic surface 502 may move in a horizontal direction (e.g., responsive to $F_{sh}$) while it is concurrently displaced in a vertical direction (e.g., responsive to $F_{in}$). Accordingly, the support layer 440 allows the input device 400 to provide haptic feedback responsive to input forces. As a result, the input device 400 may provide a user experience similar to that of clicking or pressing a mechanical button, key, or other type of actuator.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, implementations have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A support structure for an input device, comprising:
    one or more fixed surfaces configured to be mounted to a housing;
    a dynamic surface configured to be mounted to a sensor layer of the input device;
    a plurality of first deformable segments cantilevering from the one or more fixed surfaces and configured to deflect in a first direction responsive to an input force exerted on the sensor layer, the input force being orthogonal to an input surface of the input device;
    a plurality of second deformable segments connecting the plurality of first deformable segments to the dynamic surface and configured to deflect in one or more second directions responsive to shear forces exerted on the dynamic surface, the shear forces being parallel to the input surface; and
    a plurality of bridge elements at least partially overlaying the plurality of first deformable segments, respectively, the plurality of bridge elements being configured to transfer the input force from the sensor layer to the plurality of first deformable segments.

2. The support structure of claim 1, wherein the one or more fixed surfaces, the dynamic surface, the plurality of first deformable segments, and the plurality of second deformable segments are integrally formed from a single continuous layer of material.

3. The support structure of claim 2, wherein the material comprises a spring metal.

4. The support structure of claim 1, wherein the plurality of first deformable segments and the plurality of second deformable segments are coplanar with the dynamic surface.

5. The support structure of claim 1, wherein the plurality of second deformable segments is configured to deflect in the one or more second directions concurrently while one or more first deformable segments of the plurality of first deformable segments are deflected in the first direction.

6. The support structure of claim 1, wherein each of the plurality of first deformable segments is disposed in a respective corner of the support structure.

7. The support structure of claim 1, wherein the sensor layer is not attached to the plurality of bridge elements.

8. The support structure of claim 1, wherein the dynamic surface includes a plurality of protrusions that tuck under the plurality of bridge elements, respectively.

9. The support structure of claim 1, wherein each of the plurality of bridge elements includes a raised bump configured to be seated within a respective groove in the sensor layer.

10. The support structure of claim 1, wherein each of the plurality of first deformable segments is configured to return to a respective resting state responsive to the input force being removed from the sensor layer.

11. The support structure of claim 1, wherein each of the plurality of second deformable segments is configured to return to a respective resting state responsive to the shear forces being removed from the dynamic surface.

12. An input device, comprising:
a housing;
a sensor layer; and
a support structure including:
one or more fixed surfaces mounted to the housing;
a dynamic surface mounted to the sensor layer;
a plurality of first deformable segments cantilevering from the one or more fixed surfaces and configured to deflect in a first direction responsive to an input force exerted on the sensor layer, the input force being orthogonal to an input surface of the input device;
a plurality of second deformable segments connecting the plurality of first deformable segments to the dynamic surface and configured to deflect in one or more second directions responsive to shear forces exerted on the dynamic surface, the shear forces being parallel to the input surface; and
a plurality of bridge elements at least partially overlaying the plurality of first deformable segments, respectively, the plurality of bridge elements being configured to transfer the input force from the sensor layer to the plurality of first deformable segments.

13. The input device of claim 12, wherein the one or more fixed surfaces, the dynamic surface, the plurality of first deformable segments, and the plurality of second deformable segments are integrally formed from a single continuous layer of material.

14. The input device of claim 12, further comprising:
a haptic actuator coupled to the support structure and configured to produce the shear forces responsive to the input force being exerted on the sensor layer.

15. The input device of claim 12, wherein the sensor layer includes one or more force sensing electrodes that are grounded by the support structure.

16. The input device of claim 12, wherein the plurality of first deformable segments and the plurality of second deformable segments are coplanar with the dynamic surface.

17. The input device of claim 12, wherein the plurality of second deformable segments is configured to deflect in the one or more second directions concurrently while one or more first deformable segments of the plurality of first deformable segments are deflected in the first direction.

18. The input device of claim 12, wherein each of the plurality of first deformable segments is disposed in a respective corner of the support structure.

* * * * *